United States Patent
Heiden et al.

(10) Patent No.: US 7,654,007 B2
(45) Date of Patent: Feb. 2, 2010

(54) METHOD FOR IMPROVING THE REPRODUCIBILITY OF A COORDINATE MEASURING APPARATUS AND ITS ACCURACY

(75) Inventors: Michael Heiden, Woelfersheim (DE); Klaus Rinn, Heuchelheim (DE); Andreas Schaaf, Mittenaar-Bicken (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 35 days.

(21) Appl. No.: 12/154,785

(22) Filed: May 27, 2008

(65) Prior Publication Data
US 2008/0295348 A1    Dec. 4, 2008

(30) Foreign Application Priority Data
May 30, 2007    (DE)    .................. 10 2007 025 304

(51) Int. Cl.
G01B 11/03    (2006.01)
G01B 11/27    (2006.01)
(52) U.S. Cl. .................. 33/502; 33/1 M; 33/503
(58) Field of Classification Search .................. 33/1 M, 33/502, 503, 556, 557, 558, 559, 560, 561
See application file for complete search history.

(56) References Cited

U.S. PATENT DOCUMENTS

| | | | |
|---|---|---|---|
| 4,926,489 A | 5/1990 | Danielson et al. .............. 382/8 |
| 4,934,064 A * | 6/1990 | Yamaguchi et al. .......... 33/1 M |
| 6,161,079 A * | 12/2000 | Zink et al. .................... 33/503 |
| 6,323,953 B1 | 11/2001 | Blaesing-Bangert et al. ..... 356/614 |
| 6,549,648 B1 | 4/2003 | Rinn .......................... 382/151 |
| 6,778,260 B2 | 8/2004 | Blaesing-Bangert et al. .. 355/72 |
| 7,327,952 B2 * | 2/2008 | Enomoto ..................... 396/55 |
| 2002/0196331 A1 | 12/2002 | Rinn ........................... 348/50 |
| 2003/0106228 A1 * | 6/2003 | Fujishima .................... 33/502 |
| 2004/0040165 A1 * | 3/2004 | Bowes ......................... 33/502 |
| 2005/0104017 A1 | 5/2005 | Kimba et al. .......... 250/559.07 |
| 2005/0200846 A1 | 9/2005 | Hoenig et al. ............... 356/369 |
| 2007/0271803 A1 * | 11/2007 | Ishikawa ..................... 33/503 |
| 2009/0031572 A1 * | 2/2009 | Boesser et al. ............... 33/503 |

(Continued)

FOREIGN PATENT DOCUMENTS

DE    198 19 492    11/1999

(Continued)

OTHER PUBLICATIONS

Carola Blaesing:"Pattern Placement Metrology for Mask Making," presented by Dr. Carola Bläsing at the Semicon meeting, Education Program in Geneva, Switzerland on Mar. 31, 1998, 11 pages.

*Primary Examiner*—G. Bradley Bennett
(74) *Attorney, Agent, or Firm*—Davidson, Davidson & Kappel, LLC (57) ABSTRACT

A method for improving the reproducibility of a coordinate measuring machine and its accuracy is disclosed. Using at least one measuring field of a camera, a plurality of images of at least one structure on the substrate are recorded. The substrate is placed on a measuring stage traversable in the X coordinate direction and the Y coordinate direction, the position of which is determined during imaging using a displacement measuring system. The measuring field is displaced by the amount of the deviation determined.

12 Claims, 8 Drawing Sheets

U.S. PATENT DOCUMENTS

2009/0199421 A1 * 8/2009 Eaton .................... 33/503

FOREIGN PATENT DOCUMENTS

| DE | 198 25 829 | 12/1999 |
| DE | 101 29 29 818 | 1/2003 |
| DE | 101 40 174 A1 | 3/2003 |
| DE | 10 2004 012 125 | 9/2005 |
| DE | 10 2004 058 655 | 3/2006 |

* cited by examiner

METHOD FOR IMPROVING THE REPRODUCIBILITY OF A COORDINATE MEASURING APPARATUS AND ITS ACCURACY

This claims the benefit of German Patent Application No. DE 10 2007 025 304.6, filed on May 30, 2007 and hereby incorporated by reference herein The present invention relates to a method for improving the reproducibility of a coordinate measuring apparatus and its accuracy.

BACKGROUND

A coordinate measuring device for the measurement of structures on substrates for the manufacture of wafers is described in the paper entitled "Pattern Placement Metrology for Mask Making", presented by Dr. Carola Bläsing at the Semicon meeting, Education Program in Geneva, Switzerland on Mar. 31, 1998. For further functional details and details of the construction of the coordinate measuring apparatus please refer to the above mentioned publication and the commercially available models (currently LMS-IPRO II and III). In the context of the present application, the terms "sample", "substrate" and the general term "object" are to be regarded as synonymous. In the production of semiconductor chips arranged on wafers, with ever increasing integration the structural widths of the individual structures become ever smaller. As a consequence, the requirements as to the specification of coordinate measuring devices used as measuring and inspection systems for measuring the edges and the positions of structures and for measuring structural widths become ever more stringent.

In the above-mentioned publication the structures are measured using so-called measuring windows or measuring fields. The fields are defined by the user of the coordinate measuring machine in the coordinate measuring system of the CCD camera or CCD chip of the camera. Subsequent adjustment to the actual conditions during the measuring process does not take place.

The measuring fields (ROI=region of interest), evaluated for the measurement, are as already mentioned defined in the coordinate system of the CCD camera. The structure to be measured is positioned under the lens assembly by the measuring stage of the coordinate measuring machine and imaged onto the CCD chip of the camera. The position of this image relative to the coordinate system of the CCD camera is, however, dependent on the actual position of the measuring stage. Due to the limited positioning accuracy of the measuring stage the structure is located at a slightly different position each time it is measured.

Assuming defects are found on a structure, for example edge roughness or dust particles, it is possible that the defect is located in the measuring field one time and not another depending on the actual position of the measuring stage. Thus, profiles are not reproducible and the reproducibility of the measurement suffers as a result. The accuracy of the coordinate measuring machine itself is also directly affected in this way. Another cause of inaccuracy is that the structure edges are not at right angles to the measuring direction or that the structure ends in the measuring window (ROI region of interest).

German Patent Application No. DE 101 29 818 A1 discloses a method for reading out a detector chip of an electronic camera. The detector chip is used in a coordinate measuring device to determine the position of an edge of a structure on a substrate. DE 101 29 818 A1 does not, however, in any way address the problem underlying the present invention. The positioning accuracy of the measuring stage is not taken into consideration with reference to the measuring accuracy of the coordinate measuring machine.

German Patent No. DE 10 2004 012 125 B3 discloses an ellipsometric measuring method with ROI based image correction. The ellipsometric imaging measuring method records a plurality of individual images in sequence, each of at least one part of the object. It must be noted, however, that an ellipsometric measuring method is not suitable for determining the position or the width of a structure on a substrate. The method proposed in D2 is used to determine position and distortion information from the partial images, i.e. from the image information contained in them. While the ROI can basically correspond to the entire individual image, it is advantageous if well definable, relatively small imaging areas are simply selected as the ROI. An area can be selected as the ROI, for example, that displays particular contrast to neighboring image areas. This area can then be analyzed with regard to form and position. A reference image and the first individual image can either differ or be identical. The latter is the case, for example, if the first individual image of a series of individual images recorded during measurement is used as the reference image. In a second individual image the same ROI is determined on the basis of the same parameter, i.e. each contrast. Due to optical distortion or mechanical position displacement this can, however, vary from the ROI of the first individual image in its form and/or position. Finally, readjustment of the entire image is carried out until the form and position of the ROIs is identical in both the first and second individual image.

German Patent Application No. DE 198 25 829 A1 discloses a method for determining the position of a structural element on a substrate. A measuring window, positioned over the substrate to be determined, records an image of the structure which can be transformed into an intensity profile. The position of a first edge of the structure and a second edge of the structure can then be determined on the basis of this intensity profile. The position of the structure is ultimately dependent on the positioning data of the measuring coordinate stage. Not once, however, in the entire document D3 is reference made to the fact that, when a plurality of images of the same structure are recorded using the same measuring window, errors can occur when, due to the positioning inaccuracy of the measuring stage, the measuring window comes to lie at a different position on the structure.

SUMMARY OF THE INVENTION

An object of the present invention is to provide a method to improve the accuracy and reproducibility of measurements using a coordinate measuring machine.

The present invention provides a method including the steps: defining at least one measuring field relative to the imaging field of a camera; imaging at least a first image at a position of the at least one structure on the substrate with the at least one measuring field of the camera, wherein the substrate is placed on a measuring stage traversable in the X coordinate direction and the Y coordinate direction, the position of which is determined during imaging using a displacement measuring system; determining the position and/or width of the structure on the substrate using the measured position of the measuring stage and the image recorded by the measuring field; determining a deviation between the position of the traversable measuring stage at the first recording of the first image and the position of the traversable measuring stage for the envisaged recording of the second image, prior to recording the at least one further image of the same structure; and displacing by the amount of deviation, the measuring field for recording the at least one second image of the structure and for evaluating the recording with respect to the position and/or width of the structure on the substrate, so that the measuring window is positioned at the same position of the structure as that during recording of the first image of this structure.

It is particularly advantageous in the present invention, when at least one measuring field is defined for at least one imaging field of a camera. The at least one measuring field of the camera records a plurality of images of at least one structure on the substrate. Herein the substrate is placed on a stage moveable in the X coordinate direction and the Y coordinate direction, the position of which is determined during imaging by a displacement measuring system. Prior to recording at least one further image of the same structure, any deviation between the position of the traversable measuring stage during the recording of the first image and the position of the traversable measuring stage for recording the second image is determined. The measuring field for recording at least a second image and the evaluation of the image are displaced by the amount of the deviation.

The structure to be measured may be positioned under the measuring lens that records a digital image of the structure currently to be measured using the measuring stage traversable in X coordinate direction and Y coordinate direction.

The position of the measuring stage can be determined using a displacement measuring system that is interferometrically operated. The position of the measuring stage can also be determined with a glass ruler. In this case the measuring fields are tied to the coordinate system of the measuring stage.

The measuring fields may include a matrix of N by N pixels of the pixels of the camera. An interpolation is carried out between the measured values registered by the pixels of the measuring window. The interpolation can be linear and, in the case of two-dimensions, the interpolation can be a bi-linear interpolation. Likewise, the interpolation can be a cubic interpolation and, in the case of two-dimensions, the interpolation is a bi-cubic interpolation. Similarly, the interpolation can be a spline interpolation and, in the case of two-dimensions, the interpolation is a bi-spline interpolation.

The measuring lens can be moved in the z coordinate direction, wherein a plurality of images are recorded each at a different focus position. The measuring windows are displaced in such a way, that the deviation of the position of the measuring stage is corrected for each image. The use of the inventive method is particularly advantageous for the position measurement of structures on substrates or for overlay measurement or line width measurement.

BRIEF DESCRIPTION OF THE DRAWINGS

Exemplary embodiments of the invention and their advantages will be described in the following with respect to the accompanying drawings in more detail, wherein.

DETAILED DESCRIPTION

Figure 1:
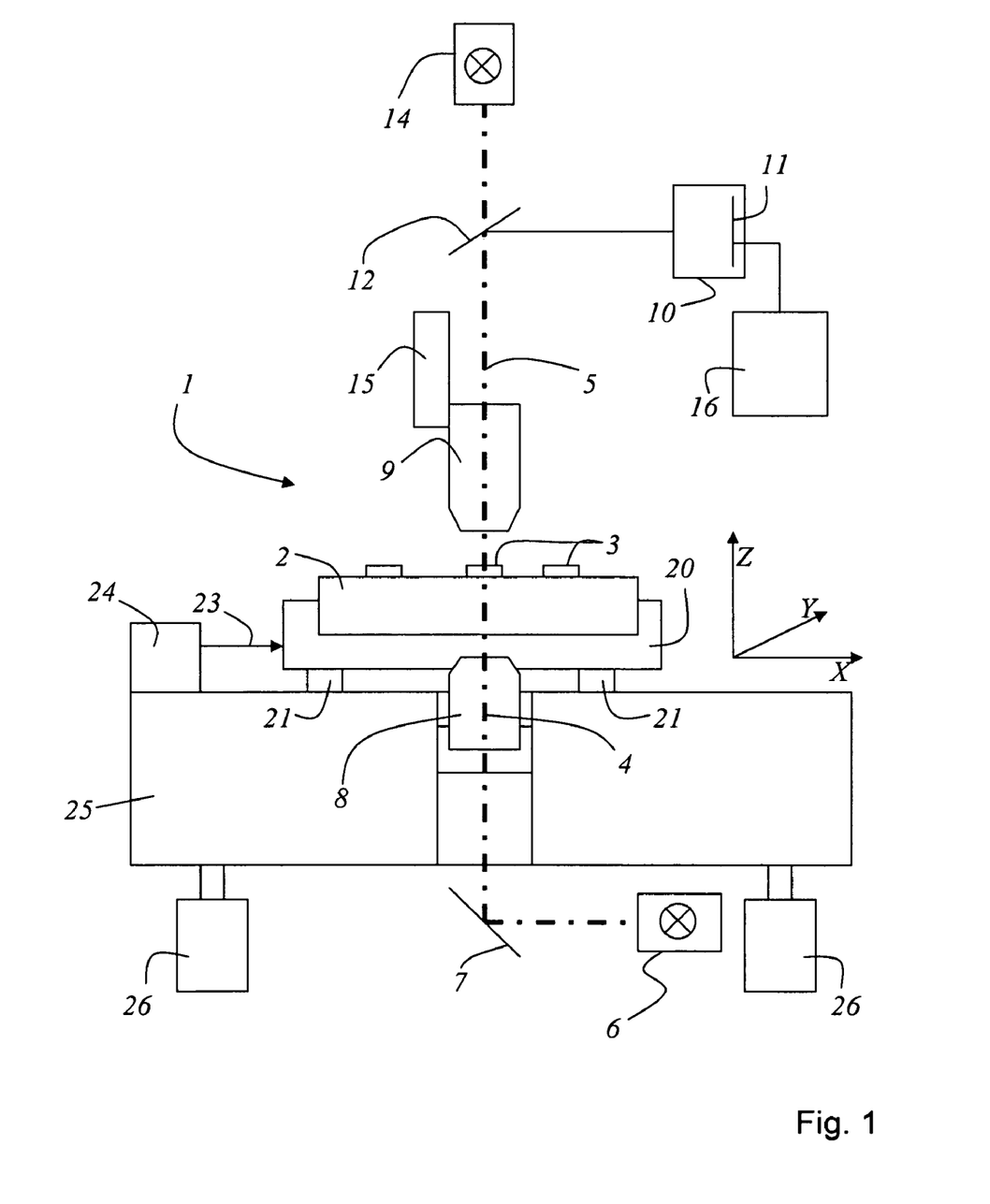
FIG. 1 schematically shows a coordinate measuring device according to the prior art.

FIG. 1 shows a coordinate measuring device 1, as already known for some time from the state of the art for measuring structures on masks and/or wafers. FIG. 1 depicts the exemplary embodiment of a coordinate measuring device 1 for optically inspecting and measuring substrates 2. Substrate 2 is a mask of, for example, quartz glass used for the manufacture of semiconductors. A plurality of structures 3 are deposited on the mask, which can be measured with the aid of coordinate measuring device 1. Coordinate measuring device 1 includes two illumination beam paths 4 and 5, wherein illumination beam path 4 is provided for the transmitted-light mode and illumination beam path 5 is provided for the incident-light mode. A light source 6 is provided for the transmitted-light mode, which passes the light via a mirror 7 towards a condenser. The light of illumination beam path 4 passes through substrate 2 and is at least substantially collected by a measuring lens 9 and imaged onto a detector 10. Detector 10 is a CCD chip 11 for converting the optical signals collected by measuring lens 9 into electric signals. The light collected by the measuring lens is directed via a mirror towards the camera or CCD chip. Further, in the incident-light beam path 5, a light source 14 is also provided with which substrate 2 or structures 3 upon substrate 2 can be illuminated. Measuring lens 9 is equipped with a focusing means 15 for moving measuring lens 9 in the Z direction. This is how structures 3 on the substrate may be imaged by measuring lens 9 in different focusing planes. In the same manner it is possible to displace condenser 8 in the Z coordinate direction. Although the above description refers to a CCD chip as a detector, this should not be regarded as limiting to the invention. It goes without saying for a person skilled in the art that any camera able to record a digital image of the object is also suitable.

The CCD chip 11 of detector 10 is connected to a computer evaluation unit 16 which reads out and evaluates the data obtained by the CCD chip 11. The computer and evaluation electronics 16 is also provided for controlling measuring stage 20 in the Y coordinate direction and the X coordinate direction.

Substrate 2 is on measuring stage 20, which is moveably supported, as already mentioned, in the X and Y coordinate directions. The movement of measuring stage 20 is via air bearings 21. A laser interferometer system 24 is only schematically indicated, allowing the position of measuring stage 20 to be interferometrically determined by means of a light beam 23. Measuring stage 20 is positioned on a granite block 25 by means of air bearings 21 in a substantially frictionless manner and can therefore be moved in the X and Y coordinate directions. Granite block 25 itself rests on vibration-damped legs 26.

Figure 2A:
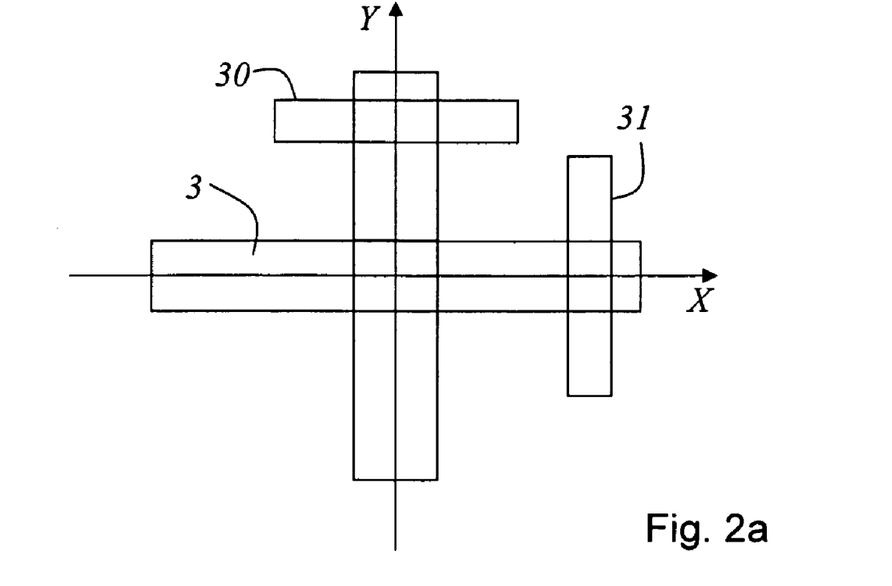
FIG. 2a is a schematic representation of a structure on a substrate measured with two measuring fields or measuring windows.
Figure 2B:
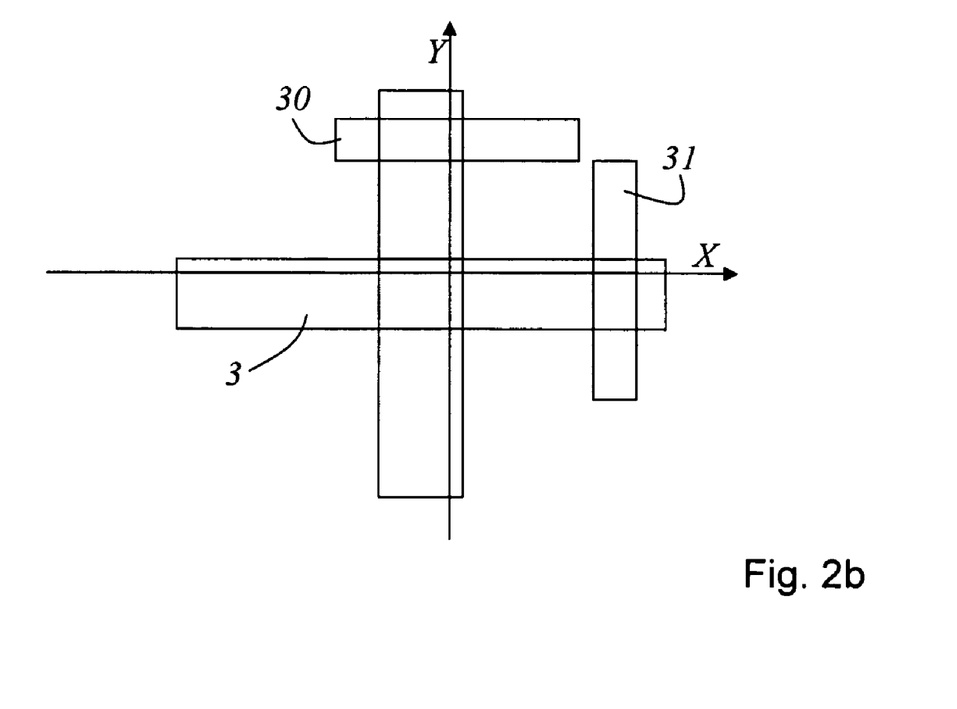
FIG. 2b shows a situation in which the measuring stage carrying the substrate changes position slightly as compared with FIG. 2a, whereby the structure is now slightly displaced with respect to the measuring fields.

FIG. 2a shows a structure 3 measured by a first measuring field 30 and a second measuring field 31. Herein, the first measuring field 30 is aligned in the X coordinate direction. The second coordinate measuring field 31 is aligned in the Y coordinate direction. The two measuring fields form an ROI (region of interest), which is evaluated for the measurement. According to the state of the art, the measuring fields 30 and 31 are defined in the coordinate system of CCD chip 11 or camera 10. Structure 3 to be measured is traversed to a position under measuring lens 9 using measuring stage 20. As mentioned above, the structure 3 to be measured is imaged by measuring lens 9 onto CCD chip 11 of camera 10. The position of this image, relative to the coordinate system of the CCD chip 11, is dependent on the actual position of the measuring stage 20 during imaging. As a result of the limited positioning accuracy of the measuring stage 20, structure 3 to be measured has a slightly different position at each measurement. This problem is depicted in FIG. 2b. FIG. 2b clearly shows that the coordinate system of CCD chip 11 is no longer positioned central to structure 3 to be measured. Thus, measuring fields 30 and 31 are also located at a different position on structure 3 to be measured. This leads to the problem discussed earlier, that as a result of the inaccurate positioning of measuring stage 20 measuring fields 30 and 31 are located at a different position on the structure which can lead to inaccurate measurement.

Figure 3A:
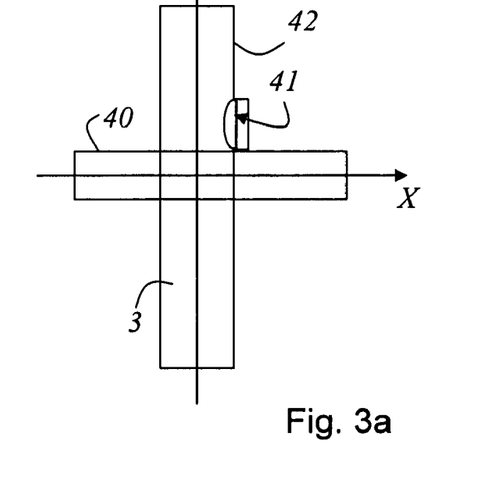
FIG. 3a shows a structure with a defect, whereby the measuring field is positioned such that the defect lies outside the measuring field.
Figure 3B:
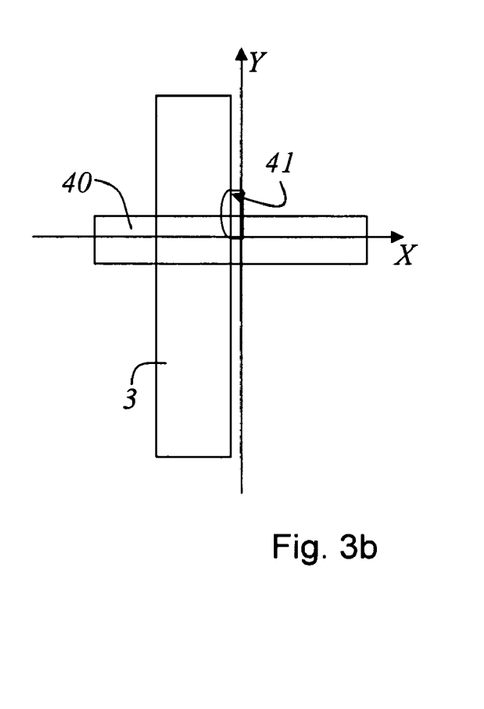
FIG. 3b shows the measuring stage carrying the substrate displaced yet again, so that the structure with the defect is now positioned within the measuring field.
Figure 3C:
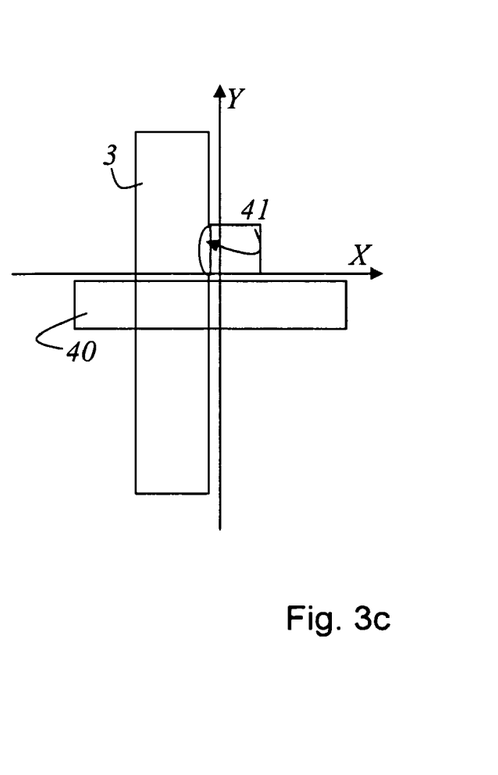
FIG. 3c shows a situation in which the measuring field has also been displaced, whereby the potential defect on the structure is always positioned outside of the measuring field.

FIG. 3a shows a structure 3 with defect 41 formed on it. Defect 41 appears as a roughness or irregularity of edge 42 on structure 3. In the situation depicted in FIG. 3a, measuring field 40 is positioned on structure 3 in such a way that defect 41 is not within measuring field 40. FIG. 3b shows another situation, with the measuring stage at a different position, whereby defect 41 is now within measuring field 40. In the situation depicted here, measuring field 40 would, namely, be positioned far enough away from defect 41 to ensure that, even considering the positioning tolerances of the measuring table, the defect would not come to lie within measuring window 40. This is, however, not always possible. Edge roughness is a problem in particular, as it can occur at any position on structure 3 and thus distort the measuring result of measuring field 40. FIG. 3c depicts a situation wherein measuring field 40 is likewise displaced. Defect 41 is now no longer within measuring field 40. In particular, any edge roughness is always scanned at the same position on the structure and thus has no effect on the measuring result. This can, however, only be achieved as a result of the measuring field 40 always being moved to the same position on the structure, independent of the positioning accuracy of the measuring stage.

Figure 4A:
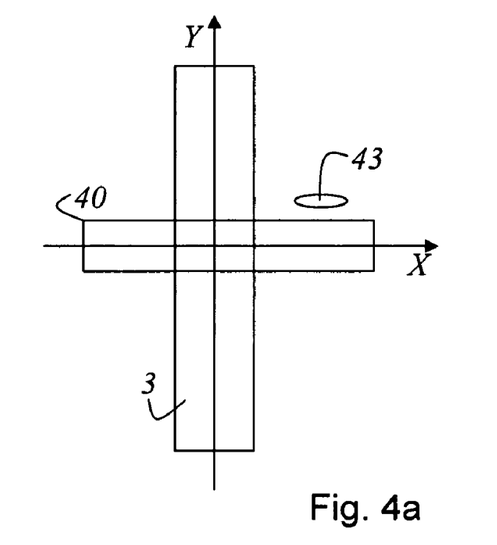
FIG. 4a shows a schematic representation, wherein a defect is located near a structure to be measured.
Figure 4B:
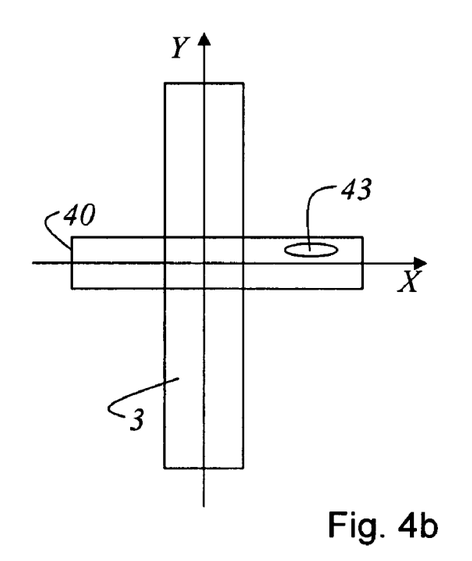
FIG. 4b shows a representation, wherein the defect is now positioned within the measuring window as a result of the inaccurate positioning of the measuring stage.
Figure 4C:
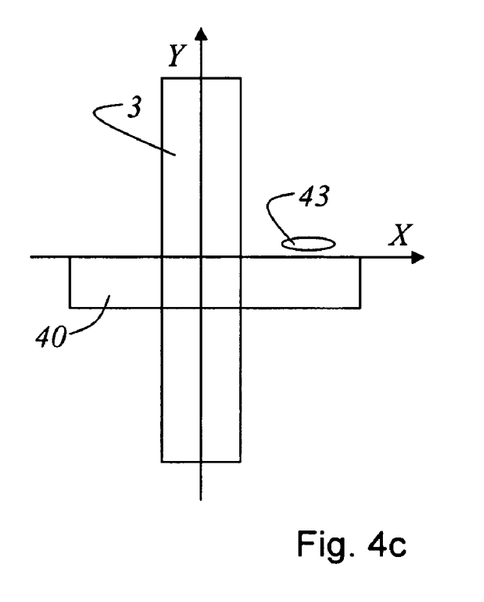
In FIG. 4c the measuring field is also displaced by the deviation amount resulting from the inaccurate positioning of the measuring stage.

FIGS. 4a to 4c show a similar situation to that depicted in FIGS. 3a to 3c. It is thus possible, for example, for a defect 43 to be in the proximity of structure 3. Here, defect 43 can be a dust particle or a scratch on the substrate. It can, however, also be regular structures in the immediate vicinity of the measuring positions. A typical example of such structures, are the assist structures (e.g. hammerheads at the end of lines) deposited on masks or substrates in semiconductor manufacture. The problem arising from such regular structures on masks will occur, in particular, in very closely-spaced structures. An example of this, is e.g. contact holes. As illustrated in FIG. 4a, the measuring window is positioned such, with respect to structure 3, that defect 43 is not located within the measuring field. If, as depicted in FIG. 4b, the stage is now moved to a different measuring position, it is possible that defect 43 is located within measuring window 40. This again would lead to a distortion of the measuring result of structure 3 to be measured. As illustrated in FIG. 4c, this problem is solved by measuring window 40 being moved in a way that ensures that defect 43 does not lie within measuring window 40.

Figure 5A:
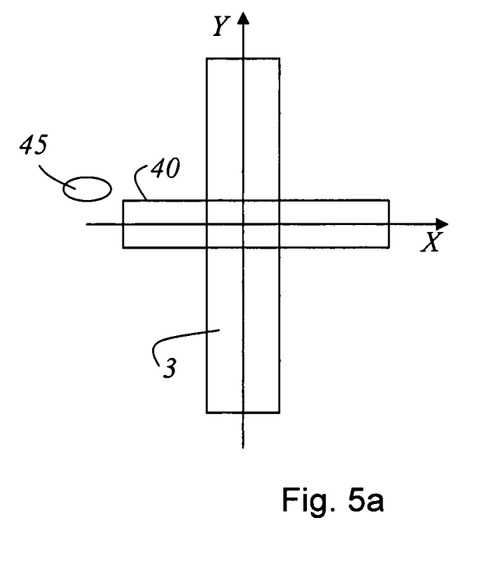
FIG. 5a is a schematic representation of a defect located on the narrow side of the measuring field.
Figure 5B:
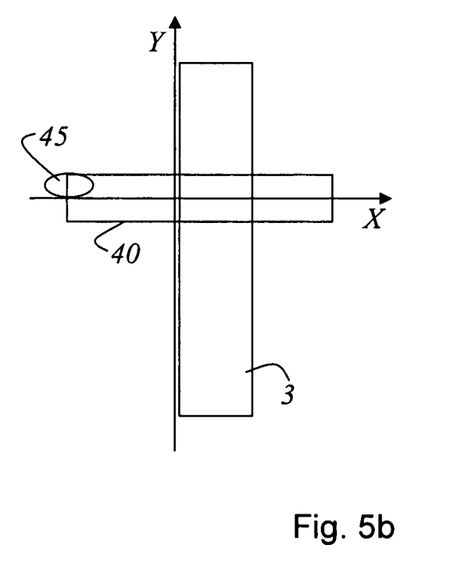
FIG. 5b shows a representation in which the defect is now positioned in the measuring field as a result of the inaccurate positioning of the measuring stage.
Figure 5C:
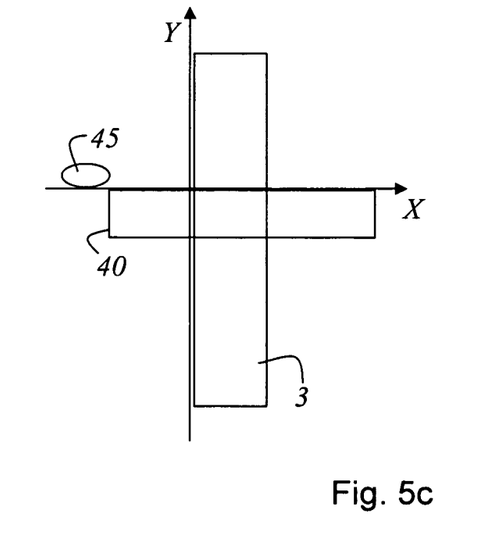
FIG. 5c shows a representation, wherein the measuring field is displaced by the deviation amount resulting from the inaccurate positioning of the measuring stage, so that the defect is positioned outside of the measuring field.

FIGS. 5a to 5c show a situation, wherein defects can be located on the narrow side of measuring field 40. In FIG. 5a, measuring field 40 is positioned above structure 3 in a manner that ensures that defect 45 is not located within measuring field 40. In FIG. 5b, on the other hand, the stage is at a different position as a result of inaccurate positioning, whereby measuring field 40 now also contains defect 45. FIG. 5c illustrates how measuring field 40 is displaced in the X coordinate direction and in the Y coordinate direction until the defect lies outside measuring window 40. Additionally, it can be noted that measuring field 40 is now at an identical position to that initially depicted in FIG. 5a.

Figure 6:
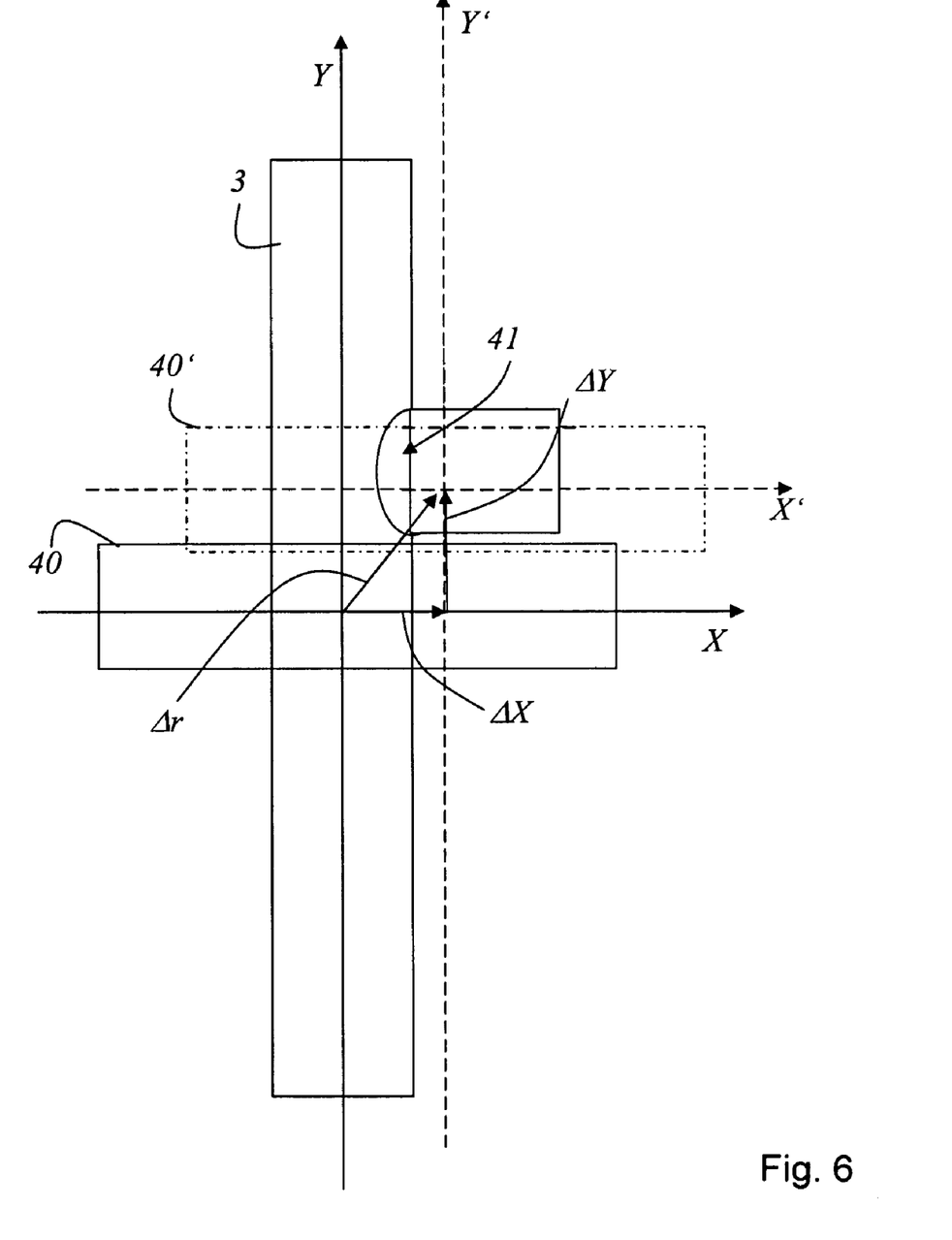
FIG. 6 shows a schematic representation of the displacement of the measuring field resulting from the positioning accuracy of the measuring stage.

FIG. 6 shows a schematic representation of the principle of the present invention. Using at least one measuring field of the camera, at least one first image of at least one structure on the substrate is imaged. Herein the substrate is placed on a measuring stage traversable in the X coordinate direction and the Y coordinate direction, the position of which is determined during imaging by a displacement measuring system. Prior to recording at least one further image of the same structure, a potential deviation between the position of the traversable measuring stage during recording of the first image and the position of the traversable measuring stage for recording the second image is determined. In the case of a measuring field tied to the coordinate system of the measuring stage, this measuring field will be located at a different position on structure 3 as a result of the deviation. If the measuring stage does not achieve its original position for the second measurement, but has an offset of $\Delta \vec{r} = (\Delta x, \Delta y)$, compared to its target position, then the measuring field on the CCD chip of the camera will likewise be displaced by the amount $\Delta \vec{r}$. The deviation $\Delta \vec{r}$ of the measuring stage from the setpoint position is determined in the coordinate measuring device. This information is used to correct the measuring fields. In FIG. 6, measuring field 40 is displaced by $\Delta \vec{r}$ during the first measurement and measuring field 40' comes to lie at a different position on the structure. Measuring field 40' is tied to the coordinate system of the camera or the CCD chip of the camera, as a result of which measuring field 40' is displaced by the deviation amount of the measuring stage, whereby ultimately measuring field 40, or 40' comes to lie at the same position as during the first measurement of structure 3 to be measured. Displacement of the measuring fields can cause the measuring field to be positioned between the pixels of the CCD chip. In such a case, the profile values are interpolated from the values of the CCD chip. If a measuring window of a size M×N pixels is defined on the CCD chip, then these M×N pixels are interpolated from the pixels of the CCD chip in proximity to the field. Interpolation can be carried out with the well known mathematical methods. In the case of a two-dimensional CCD chip, a bi-linear interpolation, a bi-cubic interpolation or a bi-spline interpolation can, for example, be carried out. If the CCD chip is a one-dimensional chip or if interpolation is to be carried out in only one dimension, a linear interpolation, a cubic interpolation or a spline interpolation is implemented. It is particularly advantageous in the case of the coordinate measuring device, to record a whole batch of images. A batch of images can be recorded, for example, by displacing the focus position of the measuring lens.

Figure 7:
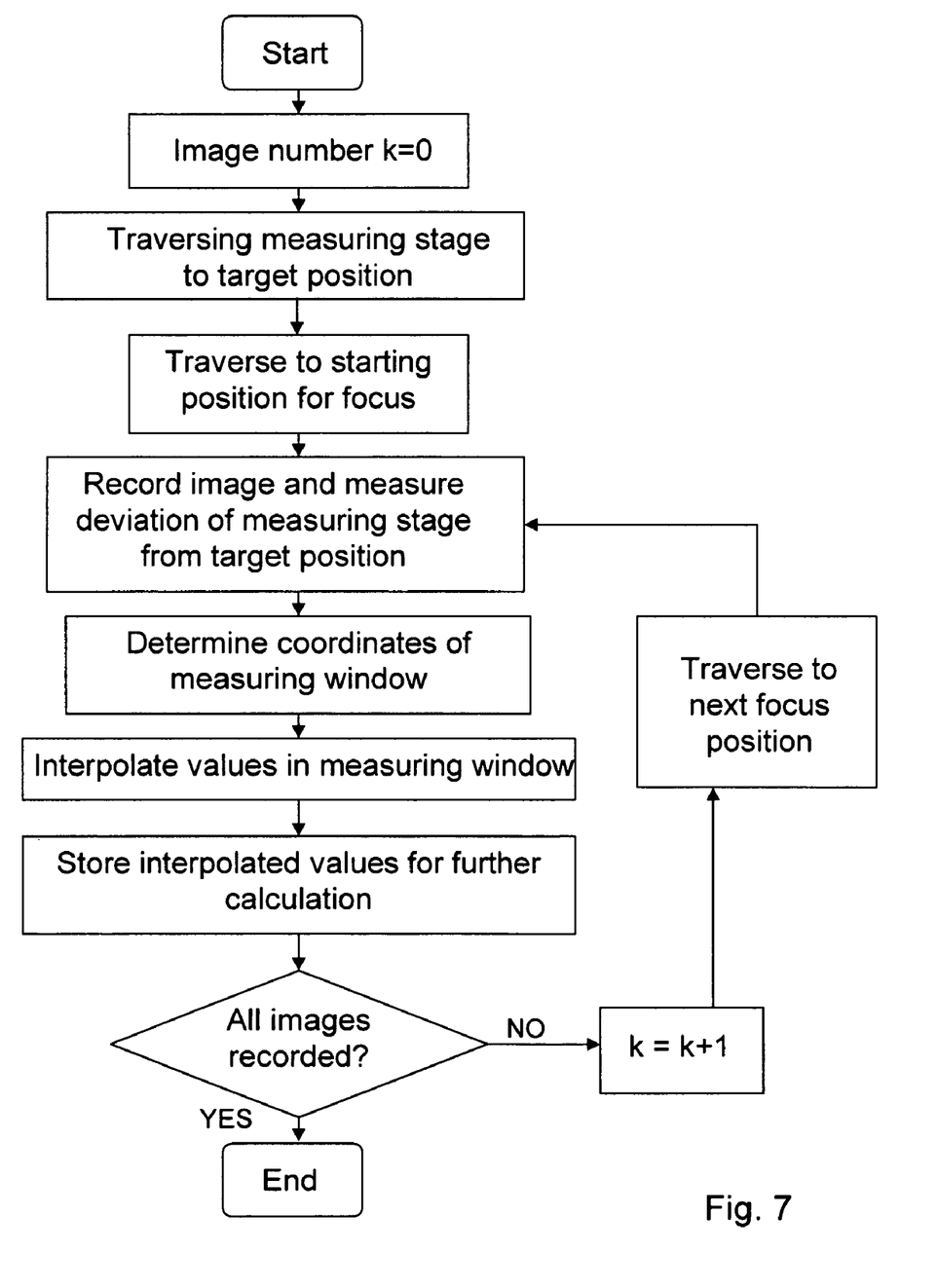
FIG. 7 shows a schematic representation of the flow chart of the measurement according to the present invention.

FIG. 7 shows a flow chart of the inventive method. A structure is in the illumination beam path of the measuring lens. An image K=0 is then recorded of the structure by the measuring lens. Subsequently, the measuring stage is moved to another target position. The target position R is derived from the individual components in the X coordinate direction and the Y coordinate direction. Once the stage has reached the target position, the focus is adjusted to the starting position. A further image is recorded, and parallel to imaging, the deviation of the measuring stage from the target position is determined. The deviation of the measuring stage $\Delta \vec{r}$ is derived from the individual deviations of the individual components $\Delta X$ in X coordinate direction and $\Delta Y$ in Y coordinate direction. Finally, the coordinates of the measuring window are determined, wherein the corrected data of the measuring window is compiled from the coordinates of the original measuring window $R_{ROI}$ plus and $\Delta \vec{r}$, representing the deviation of the measuring stage from the target position. The values in the measuring window are interpolated according to a suitable method. The interpolated values are stored for further calculation in a memory of the computer associated with the coordinate measuring device. Finally, a query is made as to whether all images have been recorded. If this is not the case, the measuring lens is traversed to the next focus position and the K plus individual image is recorded. This is repeated until all the required images of an image batch have been recorded. The inventive method is suitable for use with both 2D-masks and wafer metrology. A 2D measurement is, however, not a prerequisite, it would also be advantageous for a 1D measurement. Position and overlay measurements, in particular, benefit from this method.

Figure 8:
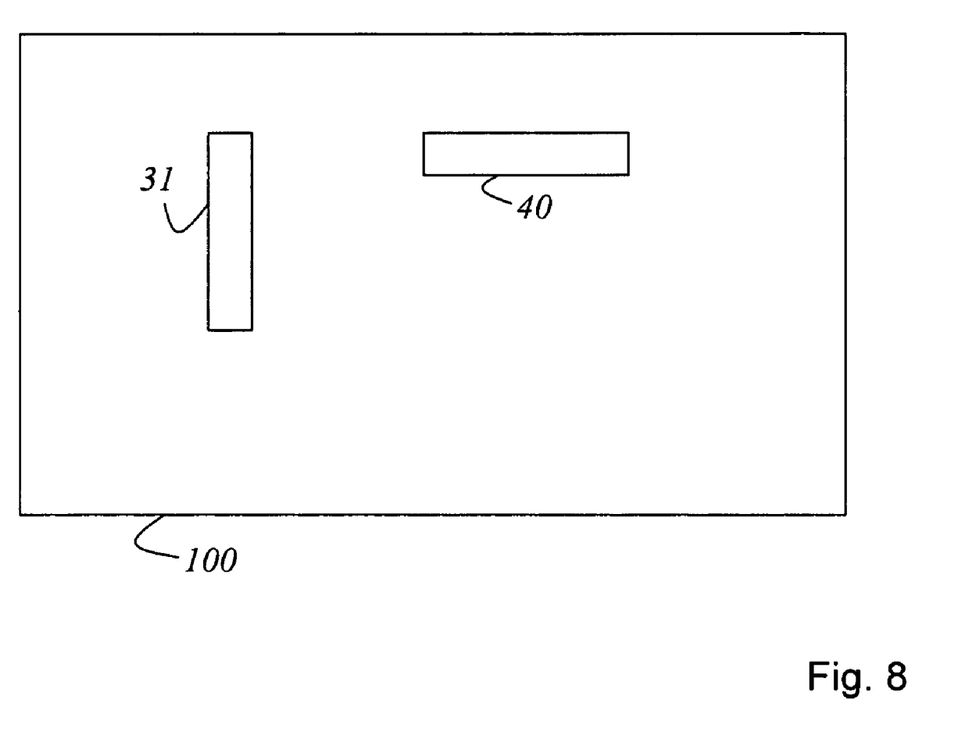
FIG. 8 shows a schematic association of the measuring field in the image field of the camera.

FIG. 8 shows a schematic allocation of measuring field 30, 31, 40 in imaging field 100 of a camera. In the embodiment illustrated here, two measuring fields 31, 40 with differing orientation are defined in imaging field 100 of the camera.

What is claimed is:

1. A method for improving the reproducibility of a coordinate measuring machine and its accuracy, comprising the steps:

defining at least one measuring field relative to an imaging field of a camera;

imaging at least a first image at a position of the at least one structure on a substrate with the at least one measuring field of the camera, wherein the substrate is placed on a measuring stage traversable in the X coordinate direction and the Y coordinate direction, the position of the measuring stage being determined during imaging using a displacement measuring system;

determining the position and/or width of the structure on the substrate using the measured position of the measuring stage and the first image recorded by the measuring field;

determining a deviation between the position of the measuring stage at the first recording of a first image and a further position of the measuring stage for an envisaged recording of at least one second image of the same structure, prior to recording the second image; and displacing by the amount of deviation, the measuring field for recording the at least one second image of the structure and for evaluating the recording with respect to the position and/or width of the structure on the substrate, so that a measuring window is positioned at the same position of the structure as that during recording of the first image of this structure.

2. The method according to claim 1, wherein the structure to be measured by the measuring stage traversable in X-coordinate direction and Y-coordinate direction is positioned under a measuring lens, whereby a digital image is recorded of the area of the structure to be measured, which comes to lie within the measuring window.

3. The method according to claim 1, wherein the position of the measuring stage is determined using a displacement measuring system that is interferometric.

4. The method according to claim 1, wherein the position of the measuring stage is determined using a displacement measuring system that is a glass ruler.

5. The method according to claim 1, wherein the at least one measuring field of the camera is tied to a coordinate system of the measuring stage.

6. The method according to claim 1, wherein the at least one measuring field of the camera is formed of a matrix of N by M pixels of a chip of a digital camera.

7. The method according to claim 6, wherein an interpolation is carried out between the measured values registered by the pixels of the measuring field.

8. The method according to claim 7, wherein the interpolated values are stored for further calculation.

9. The method according to claim 2, wherein the measuring lens is moved in the Z coordinate direction, wherein a plurality of images are recorded each at a different focus position, and wherein the measuring window is displaced in such a way that the variation of the position of the measuring stage is corrected for each image so that the measuring window is positioned at the same position of the structure as that during the previous image.

10. The method according to claim 1, wherein the method is applicable for measuring the positions of structures on a substrate.

11. The method according to claim 1, wherein the method is applicable for an overlay measurement.

12. The method according to claim 1, wherein the method is applicable for measuring line width.

* * * * *